(12) United States Patent
Kaupert

(10) Patent No.: US 9,028,011 B2
(45) Date of Patent: May 12, 2015

(54) METHOD FOR OPERATING A PARKING BRAKE MODULE IN THE EVENT OF DEFECTS AND PARKING BRAKE MODULE SUITABLE FOR PERFORMING THE METHOD

(75) Inventor: Oliver Kaupert, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 597 days.

(21) Appl. No.: 13/049,335

(22) Filed: Mar. 16, 2011

(65) Prior Publication Data
US 2011/0187181 A1 Aug. 4, 2011

Related U.S. Application Data

(63) Continuation of application No. PCT/EP2009/006731, filed on Sep. 17, 2009.

(30) Foreign Application Priority Data

Sep. 17, 2008 (DE) .......................... 10 2008 047 631

(51) Int. Cl.
*B60T 15/14* (2006.01)
*B60T 13/36* (2006.01)
*B60T 13/68* (2006.01)
(Continued)

(52) U.S. Cl.
CPC .............. *B60T 13/36* (2013.01); *B60T 13/683* (2013.01); *B60T 17/02* (2013.01); *B60T 17/18* (2013.01)

(58) Field of Classification Search
CPC ....... B60T 17/22; B60T 17/221; B60T 17/02; B60T 8/885; B60T 8/94

USPC .......... 303/10, 11, 122, 122.09, 122.15, 3, 15, 303/20, 71

See application file for complete search history.

(56) References Cited

U.S. PATENT DOCUMENTS

| 6,276,761 | B1 | 8/2001 | Beck |
| 6,540,308 | B1 | 4/2003 | Hilberer |
| 7,431,406 | B2 * | 10/2008 | Aumuller et al. ............... 303/15 |

(Continued)

FOREIGN PATENT DOCUMENTS

| DE | 198 35 638 A1 | 2/2000 |
| DE | 102006023632 | * 11/2007 |

(Continued)

OTHER PUBLICATIONS

International Search Report dated Aug. 25, 2010 with English translation (four (4) pages).

(Continued)

*Primary Examiner* — Vishal Sahni
(74) *Attorney, Agent, or Firm* — Crowell & Moring LLP

(57) ABSTRACT

A method is provided for operating a parking brake module that is at least partially integrated into a compressed air generation system in the event of defects, having a control unit, solenoid valves, and a relay valve for aerating and deaerating at least one spring-loaded brake cylinder. A pressure in the parking brake module which is elevated compared to a normal pressure is determined. A constant compressed air delivery is stopped. A reduced switch-off pressure of the compressed air generation system is set. The pressure level in the parking brake module is lowered to the reduced switch-off pressure through repeated activation of the relay valve.

17 Claims, 1 Drawing Sheet

(51) Int. Cl.
*B60T 17/02* (2006.01)
*B60T 17/18* (2006.01)

(56) References Cited

U.S. PATENT DOCUMENTS

| | | | |
|---|---|---|---|
| 7,784,879 B2* | 8/2010 | Koelzer | 303/3 |
| 8,078,377 B2 | 12/2011 | Diekmeyer et al. | |
| 8,172,339 B2* | 5/2012 | Fries et al. | 303/11 |
| 2007/0096554 A1 | 5/2007 | Detlefs et al. | |
| 2009/0127926 A1* | 5/2009 | Fries et al. | 303/15 |
| 2010/0025141 A1* | 2/2010 | Bensch et al. | 180/271 |
| 2010/0036576 A1* | 2/2010 | Diekmeyer et al. | 701/70 |

FOREIGN PATENT DOCUMENTS

| | | | |
|---|---|---|---|
| DE | 10 2006 048 071 A1 | | 4/2008 |
| DE | 102006048071 | * | 4/2008 |
| DE | 10 2007 002 020 A1 | | 7/2008 |
| EP | 0 308 376 A1 | | 3/1989 |

OTHER PUBLICATIONS

German Office Action dated Jun. 23, 2009 with English translation (six (6) pages).

Chinese-language Office Action dated Jul. 19, 2013 (nice (9) pages).

* cited by examiner

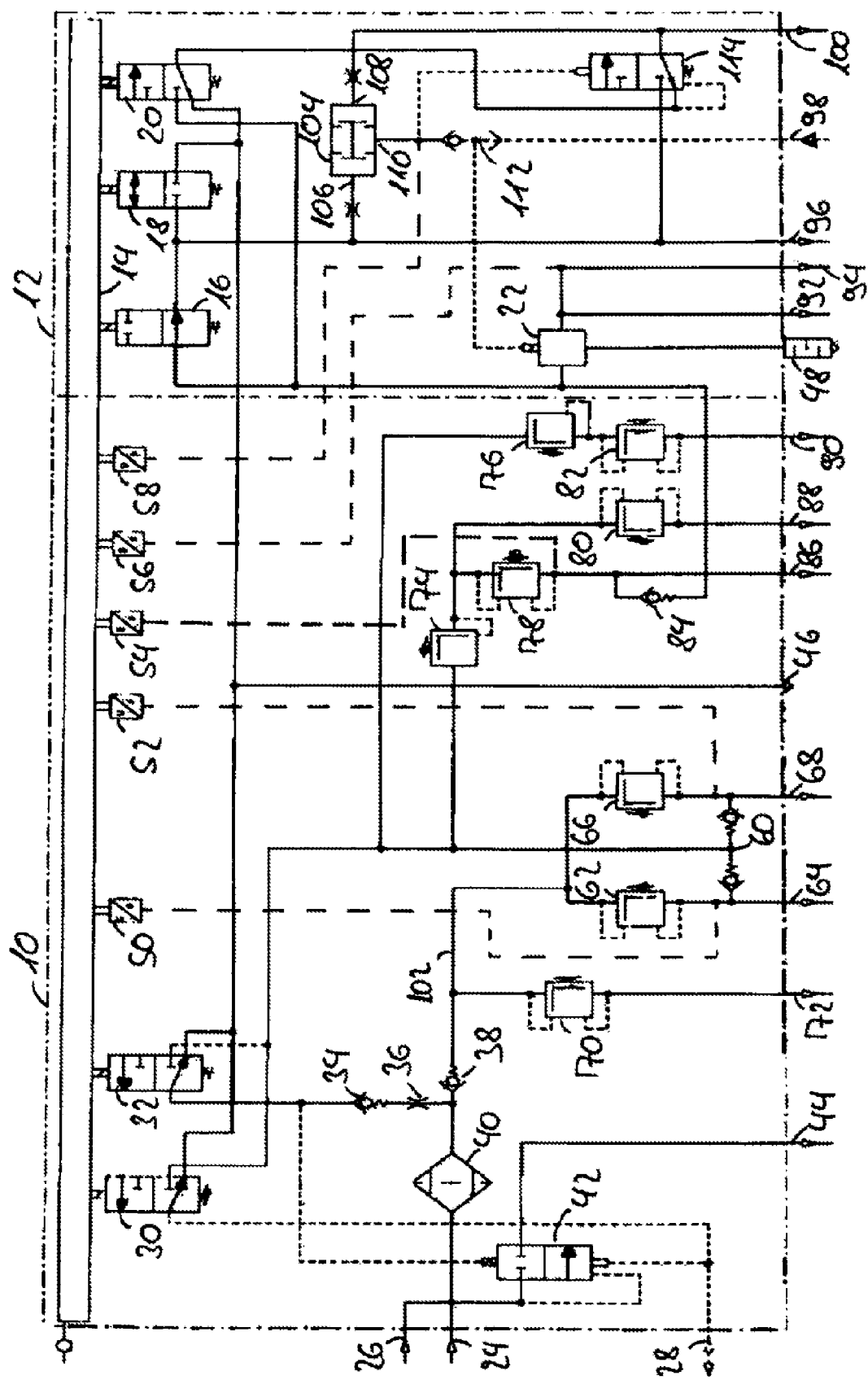

METHOD FOR OPERATING A PARKING BRAKE MODULE IN THE EVENT OF DEFECTS AND PARKING BRAKE MODULE SUITABLE FOR PERFORMING THE METHOD

CROSS-REFERENCE TO RELATED APPLICATIONS

This application is a continuation of PCT International Application No. PCT/EP2009/006731, filed Sep. 17, 2009, which claims priority under 35 U.S.C. §119 from German Patent Application No. DE 10 2008 047 631.5, filed Sep. 17, 2008, the entire disclosures of which are herein expressly incorporated by reference.

BACKGROUND AND SUMMARY OF THE INVENTION

The invention relates to a method for operating a parking brake module that is at least partially integrated into a compressed air generation system in the event of defects, including an electronic control unit, a plurality of solenoid valves for supplying a control pressure for actuation of the parking brake, and a relay valve receiving the control pressure for the ventilation and venting of at least one spring brake cylinder.

The invention further relates to a parking brake module, which is at least partially integrated into a compressed air generation system, including an electronic control unit, a plurality of solenoid valves for supplying a control pressure for actuation of the parking brake, and a relay valve receiving the control pressure for the ventilation and venting of at least one spring brake cylinder.

A compressed air supply system with connected consumers usually incorporated into a vehicle from a certain weight class onwards may be designed to deliver different supply pressures for the individual consumer circuits independent of one another. For example, a pneumatic service brake and an air suspension of the vehicle may currently be subjected to a maximum supply pressure of 12.5 bar, for example. Other consumer circuits, which usually derive no advantages of any kind from such a high supply pressure, may then be subjected to a lower supply pressure downstream of a pressure limiter. These consumer circuits can then be designed taking account of the lower supply pressure, thereby saving production costs, in particular. One example of a consumer circuit usually subjected to a lower supply pressure than the supply pressure of a service brake circuit is a parking brake circuit or a parking brake module of the vehicle, in which a supply pressure of between only 9 and 10 bar is provided.

In the event of an unwanted increase in pressure in the parking brake module, rising to the cut-out pressure of the compressed air generation system, due to a fault on the pressure limiter, for example, or if the high pressure gets into the low-pressure area via shaped seals, this leads to a persistent overloading of components of the parking brake module that are not designed for these high pressures, and of the spring brake cylinders activated via the parking brake module. The arrangement of a safety valve in the parking brake module, which solves this problem, is already known. The disadvantage to this, however, is that an additional valve takes up overall space and entails production costs, particularly if the parking brake module is at least partially integrated into the compressed air generation system.

The object of the present invention, therefore, is to obviate the need for a separate safety valve in the parking brake module, whilst maintaining the overpressure protection against excessive pressures in the parking brake module.

This, and other, objects are achieved in accordance with the present invention by a method for operating a parking brake module, in that a pressure in the parking brake module in excess of a normal pressure is detected, an ongoing compressed air delivery is interrupted, a reduced cut-out pressure of the compressed air generation system is set, and the pressure level in the parking brake module is reduced to the reduced cut-out pressure through repeated activation of the relay valve. These four steps in the method reliably serve to keep the pressure level in the parking brake module below a pre-definable threshold value, even if a defect triggers an unwanted pressure increase in the parking brake module and no separate safety is integrated in the parking brake module as overpressure protection. A pressure in the parking brake module in excess of a normal pressure can be detected directly or indirectly by one or more sensors, for example, it being possible to arrange individual sensors in the service brake circuit, on one of the spring brake cylinders, at the inlet or the outlet of the relay valve of the parking brake or in a trailer control module.

The method according to the invention is advantageously developed in that after interruption of the compressed air delivery and before setting a lower cut-out pressure, a regeneration phase is initiated until the original cut-in pressure is reached or until the original switching period has elapsed, so as to be able to discharge excess fluid more rapidly. Since a pressure increase in the parking brake module can occur only once the pressure level, at least in the compressed air generation system, has already reached a higher level than is admissible for the parking brake module, and a reduction of the pressure level in the parking brake module is sustainable only with a simultaneous reduction of the pressure level in the compressed air generation system, the fastest possible reduction of the pressure level in the compressed air generation system is advantageous.

It is especially preferred if, in the event of the pressure reduction through repeated activation of the relay valve, a cyclical pressure variation is induced in at least the one spring brake cylinder activated by the relay valve, the minimum pressure being not less than an opening pressure of the spring brake cylinder. The cyclical variation of the pressure level in at least the one spring brake cylinder activated via the relay valve serves for discharging fluid, that is to say, in particular, compressed air, from the parking brake module. Here the upper pressure level in the spring brake cylinder corresponds to the maximum pressure currently prevailing in the parking brake module, whilst the minimum pressure level is approximately 6 bar, care needing to be taken to select the minimum pressure level so that the activated spring brake cylinder will reliably remain open and the parking brake does not accidentally close.

It may be advisable, after reduction of the pressure level to the reduced cut-out pressure, for the originally higher cut-out pressure to be reinstated, if a consistently normal pressure level is detected in the parking brake module. If the fault that has occurred is reversible, that is to say there is no likelihood of a new, unwanted pressure rise in the parking brake module, or it is detected from measurements that a new rise in pressure consistently fails to materialize, it is possible following successful reduction of the pressure level in the parking brake module to again set the higher cut-out pressure of the compressed air generation system that was originally set as cut-out pressure, in order to maintain the energy efficiency of the compressed air generation system at a high level. An adjustable period covering multiple delivery and regeneration cycles, for example, may be deemed to be consistent.

Alternatively it is also feasible, after reduction of the pressure level to the reduced cut-out pressure, to continue to operate the compressed air generation system at the reduced cut-out pressure without any restriction of the functionality. In this way a reliable operation of all vehicle systems at a reduced pressure level can be ensured, without individual vehicle components, in particular the parking brake module, being damaged due to an unwanted, high pressure load. The vehicle can thereby be moved in road traffic until an opportunity for repair presents itself.

The parking brake module of generic type is developed in that the electronic control unit is suited to detecting an unwanted, high pressure in the parking brake module, interrupting any ongoing compressed air delivery, setting a reduced cut-out pressure of the compressed air generation system and reducing the pressure level in the parking brake module to the reduced cut-out pressure through repeated activation of the relay valve. In this way the advantages and peculiarities of the generic method are implemented in the context of a device.

This device is advantageously developed in that the electronic control unit is suited, after interruption of the compressed air delivery and before setting a lower cut-out pressure, to initiating a regeneration phase until the original cut-in pressure is reached or until the original switching period has elapsed, so as to be able to discharge excess fluid more rapidly.

It is especially preferred here if the electronic control unit, in the event of a pressure reduction through repeated activation of the relay valve, induces a cyclical pressure variation in at least the one spring brake cylinder activated by the relay valve, the minimum pressure being not less than an opening pressure of the spring brake cylinder.

The electronic control unit may appropriately be suited, after reduction of the pressure level to the reduced cut-out pressure, to reinstating the originally higher cut-out pressure.

Alternatively the electronic control unit may also feasibly be suited, after reduction of the pressure level to the reduced cut-out pressure, to continued operation of the compressed air generation system at the reduced cut-out pressure without any restriction of the functionality.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 shows a compressed air generation system with integral parking brake module.

DETAILED DESCRIPTION OF THE DRAWING

FIG. 1 shows a compressed air generation system with integral parking brake module. As is indicated by the dot-and-dash line, the compressed air generation system 10 represented is incorporated into a common housing (not shown) and also includes a parking brake module 12. Pneumatic lines arranged inside the compressed air generation system 10 are represented as solid lines, pneumatic control lines are represented as dashed lines and electrical leads are drawn in as elongated dashed lines. Besides an electronic control unit 14, which also undertakes the control of the parking brake module 12, the compressed air generation system 10 represented includes electrically activated solenoid valves 30, 32, a pneumatically activated discharge valve 42, a restrictor 36, non-return valves 34 and 38 and a dehumidifier 40. In addition, pressure sensors 50, 52, 54, 56 and 58, pressure limiters 74, 76 and overflow valves 62, 66, 70, 78, 80 and 82 are represented, the overflow valves 62, 66, 70, 78, 80 and 82 being integral components of a multi-circuit safety valve not further delineated.

The compressed air supply unit may be supplied with compressed air via a compressed air inlet 24 or a remote ventilation inlet 26. The compressed air fed to the compressed air supply system 10 is first treated in the dehumidifier 40, that is to say oil and dirt particles, in particular, and the air moisture are removed. The compressed air thus treated is fed via the non-return valve 38 into a delivery line 102 and from there is distributed by the components of the multi-circuit safety valve to the individual consumer circuits.

Coupled in parallel to the delivery line 102 and downstream of the overflow valves 62, 66 and 70 are a first service brake circuit 64, a second service brake circuit 68 and an air suspension 72. The supply pressures attained in the first service brake circuit 64 and in the second service brake circuit 68 can be measured by the electronic control unit 14 via the pressure sensors 50 and 52 respectively. The measured values can then be used to regulate the pressure inside the compressed air supply unit 10. A shuttle valve 60 via which, downstream of pressure limiters 74, 76 and overflow valves 78, 80 and 82, a trailer supply circuit 60, a pneumatically operated transmission 88, an additional consumer 90 and the parking brake module 12, again isolated from the trailer supply circuit 86 by a non-return valve 84, are resupplied with compressed air, is arranged downstream of the overflow valves 62 and 66.

The regeneration and control air needed for a regeneration process of the dehumidifier 40, can continue to be fed to the relevant solenoid valves 30, 32 via the shuttle valve 60. When a regeneration phase is initiated by the electronic control unit 14, the regeneration valve 32 is brought into its switching position (not shown) and at the same time or within a brief time interval the discharge control valve 30 is also brought into its switching state (not shown). By bringing the discharge control valve 30 into its switching state (not shown) a compressor control inlet 28 is ventilated, so that a compressor (not shown) is brought into its idling phase and the discharge valve 42 is brought into its switching state (not shown). As a result the air needed for the regeneration can flow from the two service brake circuits 64, 68 via the shuttle valve 60 and the discharge valve 32 through the non-return valve 34 and the restrictor 36, that is to say bypassing the non-return valve 38, through the dehumidifier 40 and the discharge valve 42 to a vent 44, where it leaves the compressed air generation system 10. In the process, the regeneration air absorbs oil and dirt particles accumulated in the dehumidifier 40 together with moisture and removes them from the system.

On completion of the regeneration phase, the discharge control valve 30 and the regeneration valve 32 are returned to their switching states shown. The compressor control outlet 28 and the pneumatic control inlet of the discharge valve 42 are thereby coupled to a vent 46 and the discharge valve 42 is returned to its switching state shown, and the compressor (not shown) is switched back into a delivery phase.

Besides the solenoid valves 16, 18 and 20 directly activated by the electronic control unit 14, the parking brake module 12 likewise controlled by the electronic control module 14 includes a relay valve 22 having a connected vent 48, explicitly represented as a silencer, which ventilates and vents the spring brake cylinders 92, 94. Here the pressure ratios in the spring brake cylinders 92, 94 can be detected by the electronic control unit 14 via the pressure sensor 56. The relay valve 22 is activated pneumatically via a shuttle valve 112, the shuttle valve 112 being pressurizable by way of a control pressure line 98 and an outlet 110 of a dual-pressure valve 104. In service braking, for example, the control pressure line 98 may be ventilated in order to avoid a closing of the service brake when the parking brake is closed, since this could lead to overloading of the parking brake cylinders 92, 94. Together with the dual-pressure valve 104 with its first inlet 106 and its second inlet 108, the solenoid valves 16, 18, 20 and 114 in a manner known in the art generate a control pressure for the relay valve 22 and two different trailer control pressures on trailer control lines 96 and 100.

The parking brake module 12 has its own safety valve serving to limit the pressure, which is suited to discharging pressure automatically from the parking brake module 12, if an admissible pressure level is exceeded. If the pressure limiter 74 is defective, for example, the pressure level in the parking brake module 12 may rise to the pressure level prevailing in the first service brake circuit 64 or the second service brake circuit 68. Since the spring brake cylinders 92, 94 in particular and a trailer circuit are not designed for this, a rapid reduction of the pressure level in the parking brake level 12 is necessary. The electronic control unit 14 first detects the inadmissible rise in the pressure level inside the parking brake module 12. This can be done through pressure measurements of the pressure sensors 54, 56 or 58, for example, the pressure sensors 56 and 58 possibly also being arranged inside the parking brake module 12. A pressure measurement directly on the parking brake cylinders 92, 94 is also possible. Alternatively an indirect estimate may also be performed via sensors in a trailer control module or in some other way known to the person skilled in the art. The important thing is simply to determine the pressure level prevailing in the Parking brake module 12.

Once a pressure exceeding the admissible pressure level in the parking brake module 12 has been detected, any ongoing compressed air delivery by the compressed air generation system 10 is interrupted, in order to prevent a further rise in the pressure level. The simultaneous initiation of a regeneration phase may be advantageous, since this will serve to bring a sustained reduction of the pressure level in the first service brake circuit 64 and the second service brake circuit 68, although this is optional. To allow sustained avoidance of an excessive pressure in the parking brake module 12, the electronic control unit 14 sets a cut-out pressure of the compressed air generation system 10 lower than that in normal operation. The level of the reduced cut-out pressure can advantageously be arrived at through the admissible pressure loading of the parking brake module, that is to say it may correspond to the normal maximum pressure in the parking brake module. Since without compressed air consumption the pressure level in the parking brake module 12 cannot fall, because of the non-return valve 84 and the overflow valve 78, the pressure level present in the parking brake module is reduced through repeated activation of the relay valve 22. In this case the pressure level in the spring brake cylinders 92, 94 is cyclically increased and reduced again, so that fluid can escape via the vent 48. Here the pressure level in the spring brake cylinders 92, 94 is varied between the pressure instantaneously prevailing in the parking brake module 12 and a minimum pressure of approximately 6 bar, the minimum pressure being selected so that the spring brake cylinders 92, 94 do not close. This is possible since the closing of the spring brake cylinders 92, 94 usually occurs at a pressure level of approximately 5.5 bar. The discharge of fluid also serves to reduce the pressure level in the two service brake circuits 64, 68. The intelligent activation therefore allows the relay valve 22 to assume the function of the safety valve in the parking brake valve.

Once the pressure level in the parking brake module 12 has been normalized again, the compressed air generation system 10 can resume its normal function at the reduced cut-out pressure. That is to say it can again deliver compressed air but now only up to the reduced cut-out pressure. In this state the vehicle can continue to be moved without restriction in road traffic. Should the electronic control unit 14 detect that the fault responsible for the unwanted pressure increase in the parking brake module 12 is reversible, it is feasible that for reasons of energy efficiency the reduced cut-out pressure will be replaced again by the higher cut-out pressure previously pertaining.

The features of the invention disclosed in the description above, in the drawings and in the claims may be essential for the realization of the invention both individually and in any combination.

TABLE OF REFERENCE NUMERALS 10 compressed air generation system
12 parking brake module
14 electronic control unit
16 solenoid valve
18 solenoid valve
20 solenoid valve
22 relay valve
24 compressed air inlet
26 remote ventilation inlet
28 compressor control outlet
30 discharge control valve
32 regeneration valve
34 non-return valve
36 restrictor
38 non-return valve
40 dehumidifier
42 discharge valve
44 vent
46 vent
48 vent
50 pressure sensor
52 pressure sensor
54 pressure sensor
56 pressure sensor
58 pressure sensor
60 shuttle valve
62 overflow valve
64 first service brake circuit
66 overflow valve
68 second service brake circuit
70 overflow valve
72 air suspension
74 pressure limiter
76 pressure limiter
78 overflow valve
80 overflow valve
82 overflow valve
84 non-return valve
86 trailer supply circuit
88 transmission
90 additional consumer
92 spring brake cylinder
94 further spring brake cylinder
96 trailer control line
98 control pressure line 100 further trailer control line
102 delivery line
104 dual-pressure valve
106 first inlet.
108 second inlet
110 outlet
112 shuttle valve
114 solenoid valve The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a parking brake module in an event of a defect that increases a pressure level in the parking brake module beyond a normal supply pressure of the parking brake module, the parking brake module being at least partially integrated into a compressed air generation system having a cut-out pressure, the parking brake module having an electronic control unit, a plurality of solenoid valves for supplying a control pressure for actuation of the parking brake module, and a relay valve receiving the control pressure for ventilation and venting of at least one spring brake cylinder, the method comprising the acts of:
    detecting the pressure level in the parking brake module in excess of the normal supply pressure of the parking brake module;
    interrupting an ongoing compressed air delivery;
    setting the cut-out pressure of the compressed air generation system from an original high cut-out pressure to a reduced cut-out pressure that is lower than the original cut-out pressure; and
    reducing the pressure level in the parking brake module to the reduced cut-out pressure, wherein repeated activation of the relay valve reduces the pressure level in the parking brake module to the reduced cut-out pressure.

2. The method according to claim 1, further comprising the act of:
    after interrupting the ongoing compressed air delivery and before setting the cut-out pressure to the reduced cut-out pressure, initiating a regeneration phase until an original cut-in pressure is reached or until an original switching period has elapsed, in order to discharge excess fluid rapidly.

3. The method according to claim 1, wherein in an event of pressure reduction through repeated activation of the relay valve, the method further comprises the act of:
    inducing a cyclical pressure variation in the at least one spring brake cylinder activated by the relay valve, wherein a minimum pressure of the cyclical pressure variation is not less than an opening pressure of the at least one spring brake cylinder.

4. The method according to claim 2, wherein in an event of pressure reduction through repeated activation of the relay valve, the method further comprises the act of:
    inducing a cyclical pressure variation in the at least one spring brake cylinder activated by the relay valve, wherein a minimum pressure of the cyclical pressure variation is not less than an opening pressure of the at least one spring brake cylinder.

5. The method according to claim 1, further comprising the acts of:
    after setting the cut-out pressure to the reduced cut-out pressure, reinstating the cut-out pressure to the original cut-out pressure if the pressure level in the parking brake module is stable.

6. The method according to claim 1, further comprising the act of:
    after setting the cut-out pressure to the reduced cut-out pressure, continuing operation of the compressed air generation system without restricting functionality of the system.

7. The method according to claim 2, further comprising the act of:
    after setting the cut-out pressure to the reduced cut-out pressure, continuing operation of the compressed air generation system without restricting functionality of the system.

8. The method according to claim 3, further comprising the act of:
    after setting the cut-out pressure to the reduced cut-out pressure, continuing operation of the compressed air generation system without restricting functionality of the system.

9. The method according to claim 1, wherein the relay valve is operatively coupled to a vent that ventilates the at least one spring brake cylinder.

10. A parking brake module for use in an event of a defect in a compressed air generation system in which the parking brake module is at least partially integrateable, wherein the defect increases a pressure level in the parking brake module beyond a normal supply pressure of the parking brake module, the compressed air generation system having a cut-out pressure, the parking brake module comprising:
    an electronic control unit;
    a plurality of solenoid valves for supplying a control pressure for actuation of a parking brake; and
    a relay valve receiving the control pressure for ventilating and venting at least one spring brake cylinder, wherein the electronic control unit is operatively configured to:
        detect a pressure level in the parking brake module that is in excess of the normal supply pressure of the parking brake module;
        interrupt any ongoing compressed air delivery;
        set the cut-out pressure of the compressed air generation system from an original cut-out pressure to a reduced cut-out pressure that is lower than the original cut-out pressure; and
        reduce the pressure level in the parking brake module to the reduced cut-out pressure, wherein repeated activation of the relay valve reduces the pressure level in the parking brake module to the reduced cut-out pressure.

11. The parking brake module according to claim 10, wherein the electronic control unit is further operatively configured to, after interruption of the any ongoing compressed air delivery and before setting the cut-out pressure to the reduced cut-out pressure, initiate a regeneration phase until an original cut-in pressure is reached or until an original switching period has elapsed in order to discharge excess fluid rapidly.

12. The parking brake module according to claim 10, wherein the electronic control unit is further operatively configured to induce a cyclical pressure variation in the at least one spring brake cylinder activated by the relay valve, in an event of a pressure reduction through repeated activation of the relay valve, wherein a minimum pressure of the cyclical pressure variation is not less than an opening pressure of the at least one spring brake cylinder.

13. The parking brake module according to claim 11, wherein the electronic control unit is further operatively configured to induce a cyclical pressure variation in the at least one spring brake cylinder activated by the relay valve, in an event of a pressure reduction through repeated activation of the relay valve, wherein a minimum pressure of the cyclical pressure variation is not less than an opening pressure of the at least one spring brake cylinder.

14. The parking brake module according to claim 10, wherein the electronic control unit is further operatively configured to reinstate the cut-out pressure to the original cut-out pressure that is higher than the reduced cut-out pressure after reduction of the pressure level in the parking brake module to the reduced cut-out pressure.

15. The parking brake module according to claim 10, wherein the electronic control unit is further operatively configured to continue operation of the compressed air generation system with the cut-out pressure set to the reduced cut-out pressure without restricting functionality after reduction of the parking brake pressure level to the reduced cut-out pressure.

16. The parking brake module according to claim 10, wherein the relay valve is operatively coupled to a vent that ventilates the at least one spring brake cylinder.

17. A method for operating a parking brake module in an event of a defect that increases a pressure level in the parking brake module beyond a normal supply pressure of the parking brake module, the parking brake module being at least partially integrated into a compressed air generation system having a cut-out pressure, the parking brake module having an electronic control unit, a plurality of solenoid valves for supplying a control pressure for actuation of the parking brake module, and a relay valve receiving the control pressure for ventilation and venting of at least one spring brake cylinder, the method comprising the acts of:

detecting the pressure level in the parking brake module in excess of the normal supply pressure of the parking brake module;

interrupting an ongoing compressed air delivery;

setting the cut-out pressure of the compressed air generation system from an original high cut-out pressure to a reduced cut-out pressure that is lower than the original cut-out pressure;

reducing the pressure level in the parking brake module to the reduced cut-out pressure through repeated activation of the relay valve, and after interrupting the ongoing compressed air delivery and before setting the cut-out pressure to the reduced cut-out pressure, initiating a regeneration phase until an original cut-in pressure is reached or until an original switching period has elapsed, in order to discharge excess fluid rapidly.

\* \* \* \* \*